US009349166B2

(12) United States Patent
Muninder

(10) Patent No.: US 9,349,166 B2
(45) Date of Patent: May 24, 2016

(54) METHOD, APPARATUS AND COMPUTER PROGRAM PRODUCT FOR GENERATING IMAGES OF SCENES HAVING HIGH DYNAMIC RANGE

(71) Applicant: Nokia Corporation, Espoo (FI)

(72) Inventor: Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 14/134,717

(22) Filed: Dec. 19, 2013

(65) Prior Publication Data

US 2014/0301642 A1 Oct. 9, 2014

(30) Foreign Application Priority Data

Dec. 31, 2012 (IN) .......................... 5524/CHE/2012

(51) Int. Cl.
*G06K 9/00* (2006.01)
*G06T 5/00* (2006.01)
*G06T 5/50* (2006.01)
*H04N 5/235* (2006.01)
*H04N 5/232* (2006.01)

(52) U.S. Cl.
CPC . *G06T 5/008* (2013.01); *G06T 5/50* (2013.01); *H04N 5/2352* (2013.01); *H04N 5/2353* (2013.01); *H04N 5/2355* (2013.01); *H04N 5/23216* (2013.01); *G06T 2207/10144* (2013.01); *G06T 2207/20208* (2013.01)

(58) Field of Classification Search
USPC .......................................................... 382/167
See application file for complete search history.

(56) References Cited

U.S. PATENT DOCUMENTS

| 8,509,565 B2 * | 8/2013 | Chen ............................. 382/284 |
| 8,570,396 B2 * | 10/2013 | Rapaport .................... 348/229.1 |
| 2010/0150473 A1 * | 6/2010 | Kwon et al. ................... 382/284 |
| 2011/0069906 A1 * | 3/2011 | Park et al. ...................... 382/284 |
| 2011/0176024 A1 * | 7/2011 | Kwon et al. ............... 348/222.1 |

FOREIGN PATENT DOCUMENTS

| EP | 2081149 A1 | 7/2009 |
| EP | 2199975 A1 | 6/2010 |

(Continued)

OTHER PUBLICATIONS

Tico et al., "Motion-Blur-Free Exposure Fusion", 17th IEEE International Conference on Image Processing, Sep. 26-29, 2010, 4 pages.

(Continued)

*Primary Examiner* — Yon Couso
(74) *Attorney, Agent, or Firm* — Nokia Technologies Oy

(57) ABSTRACT

In an example embodiment a method, apparatus and computer program product are provided. The method includes facilitating receipt of two or more images of a scene, where the two or more images are associated with different capture parameters. The method includes determining intensity gains at corresponding pixel locations of at least one image pair of the two or more images. The method further includes generating a blended image by blending pixels of images of the at least one image pair based at least on the intensity gains. A pixel associated with a pixel location of the blended image is generated by blending pixels associated with the pixel location of the images of the at least one image pair.

17 Claims, 7 Drawing Sheets

(56) References Cited

FOREIGN PATENT DOCUMENTS

| EP | 2204773 A1 | 7/2010 |
|---|---|---|
| KR | 2010-0053287 A | 5/2010 |

OTHER PUBLICATIONS

Kang et al., "High Dynamic Range Video", ACM Transactions on Graphics, Proceedings of ACM SIGGRAPH, vol. 22, Issue 3, Jul. 2003, 7 pages.

Mangiat et al., "High Dynamic Range Video with Ghost Removal", SPIE Proceedings on Applications of Digital Image Processing XXXIII, vol. 7798, Aug. 1, 2010, 8 pages.

Bigelow, "Using Blend Modes in Photoshop—Part I", Article and Photography, Retrieved on Jun. 30, 2014, Webpage available at : http://www.ronbigelow.com/articles/blend1/blend1.htm.

Block et al, "Multi-Exposure Document Fusion Based on Edge-Intensities", 10th International Conference on Document Analysis and Recognition, Jul. 26-29, 2009, pp. 136-140.

* cited by examiner

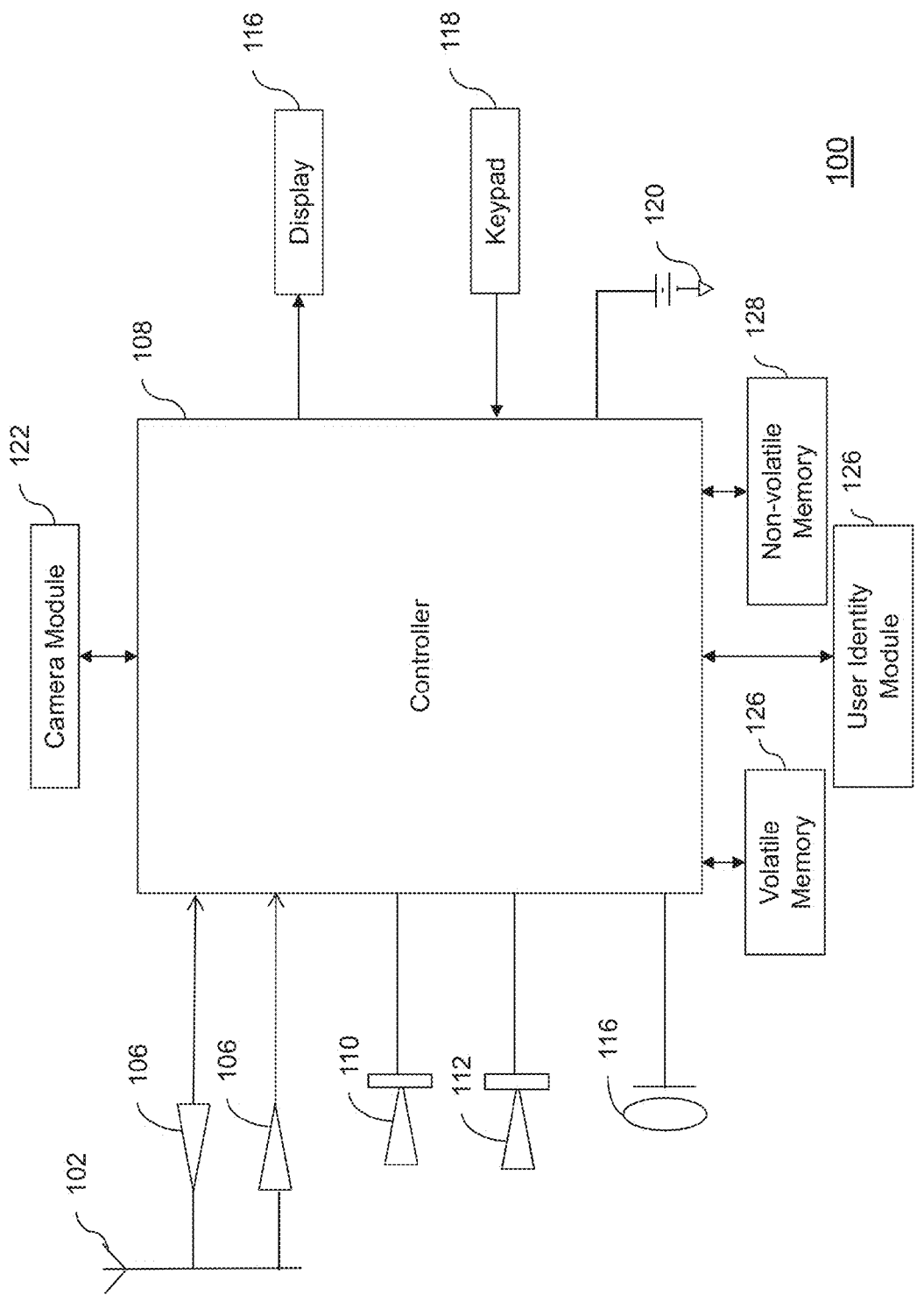

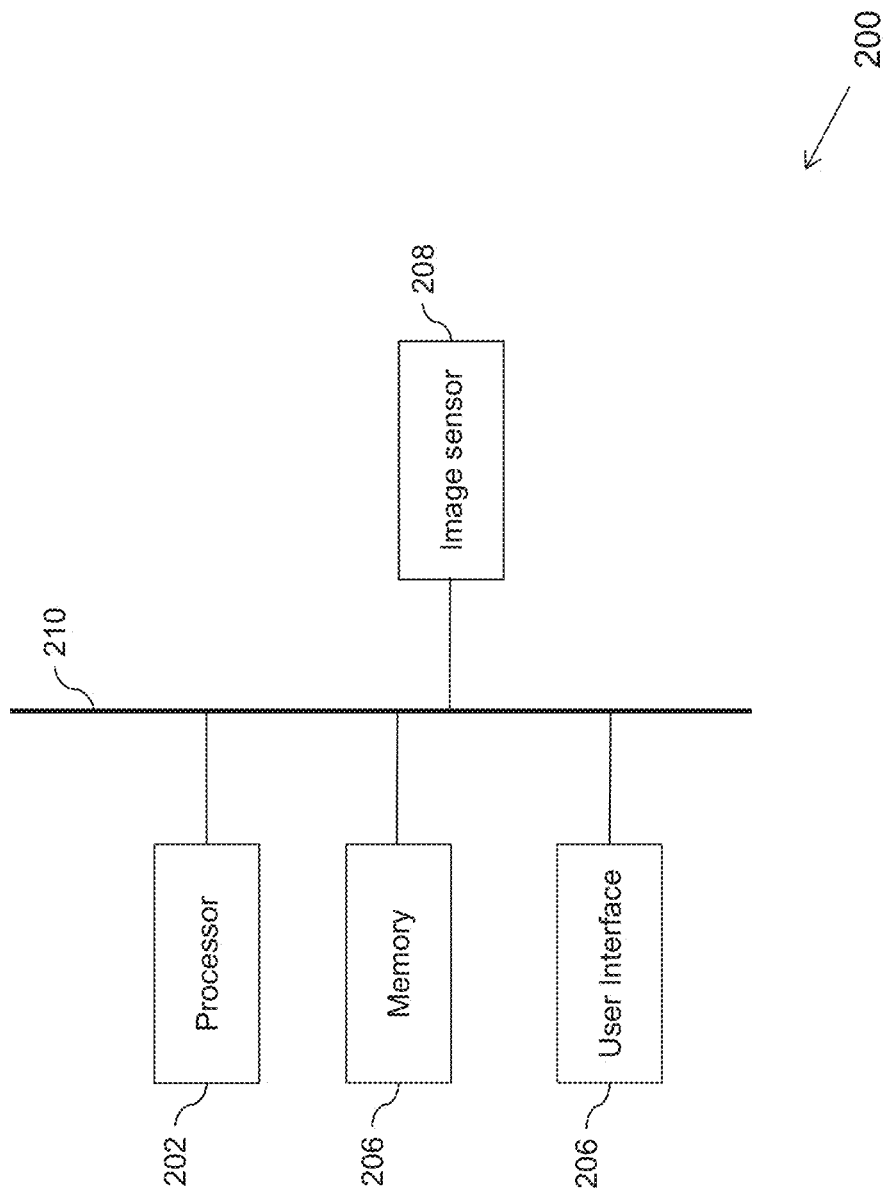

METHOD, APPARATUS AND COMPUTER PROGRAM PRODUCT FOR GENERATING IMAGES OF SCENES HAVING HIGH DYNAMIC RANGE

TECHNICAL FIELD

Various implementations relate generally to method, apparatus, and computer program product for generating images of scenes having high dynamic range.

BACKGROUND

Various electronic devices such as cameras, mobile phones, and other devices are widely used for capturing images of scenes. Oftentimes, scenes may contain high dynamic range information. For example, in a scene such as, a beach scenes or a scene having backlight, some objects for example, sky and background, may be brighter as compared to other objects and even there may be significant brightness differences between the objects across the scene. Capturing such scenes with desirable brightness across the image of the scene is a challenge as often the captured image contains one of the artifacts. For example, in an artifact, foreground objects may appear darker as compared to background objects in the captured image. In another artifact, background objects may be washed out whereas the foreground objects may be visible.

SUMMARY OF SOME EMBODIMENTS

Various aspects of examples embodiments are set out in the claims.

In a first aspect, there is provided a method comprising: facilitating receipt of two or more images of a scene, the two or more images associated with different capture parameters; determining intensity gains at corresponding pixel locations of at least one image pair of the two or more images; and generating a blended image by blending pixels of images of the at least one image pair based at least on the intensity gains, wherein a pixel associated with a pixel location of the blended image is generated by blending pixels associated with the pixel location of the images of the at least one image pair.

In a second aspect, there is provided an apparatus comprising at least one processor; and at least one memory comprising computer program code, the at least one memory and the computer program code configured to, with the at least one processor, cause the apparatus to perform at least: facilitate receipt of two or more images of a scene, the two or more images associated with different capture parameters; determine intensity gains at corresponding pixel locations of at least one image pair of the two or more images; and generate a blended image by blending pixels of images of the at least one image pair based at least on the intensity gains, wherein a pixel associated with a pixel location of the blended image is generated by blending pixels associated with the pixel location of the images of the at least one image pair.

In a third aspect, there is provided a computer program product comprising at least one computer-readable storage medium, the computer-readable storage medium comprising a set of instructions, which, when executed by one or more processors, cause an apparatus to perform at least: facilitate receipt of two or more images of a scene, the two or more images associated with different capture parameters; determine intensity gains at corresponding pixel locations of at least one image pair of the two or more images; and generate a blended image by blending pixels of images of the at least one image pair based at least on the intensity gains, wherein a pixel associated with a pixel location of the blended image is generated by blending pixels associated with the pixel location of the images of the at least one image pair.

In a fourth aspect, there is provided an apparatus comprising: means for facilitating receipt of two or more images of a scene, the two or more images associated with different capture parameters; means for determining intensity gains at corresponding pixel locations of at least one image pair of the two or more images; and means for generating a blended image by blending pixels of images of the at least one image pair based at least on the intensity gains, wherein a pixel associated with a pixel location of the blended image is generated by blending pixels associated with the pixel location of the images of the at least one image pair.

In a fifth aspect, there is provided a computer program comprising program instructions which when executed by an apparatus, cause the apparatus to: facilitate receipt of two or more images of a scene, the two or more images associated with different capture parameters; determine intensity gains at corresponding pixel locations of at least one image pair of the two or more images; and generate a blended image by blending pixels of images of the at least one image pair based at least on the intensity gains, wherein a pixel associated with a pixel location of the blended image is generated by blending pixels associated with the pixel location of the images of the at least one image pair.

BRIEF DESCRIPTION OF THE FIGURES

Various embodiments are illustrated by way of example, and not by way of limitation, in the figures of the accompanying drawings in which:

FIG. 1 illustrates a device, in accordance with an example embodiment;

FIG. 2 illustrates an apparatus for generating images of scenes having high dynamic range, in accordance with an example embodiment;

DETAILED DESCRIPTION

Figure 3B:
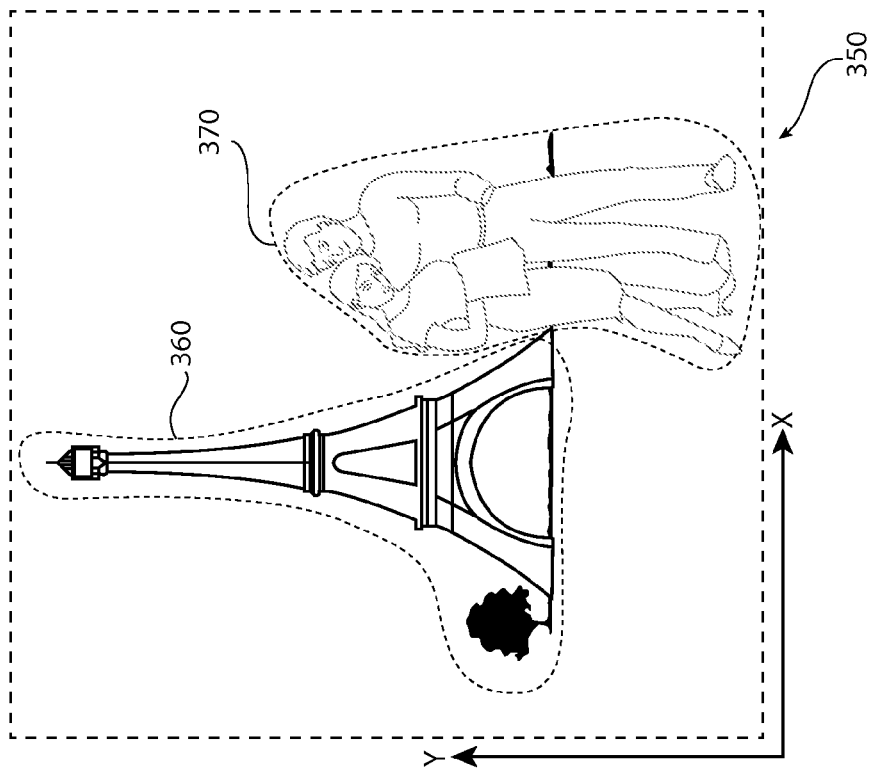
FIGS. 3A and 3B represent images of a scene having high dynamic range, in accordance with an example embodiment.

Example embodiments and their potential effects are understood by referring to FIGS. 1 through 7 of the drawings.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as universal mobile telecommunications system (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a wireless application protocol (WAP), hypertext transfer protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

FIG. 2 illustrates an apparatus 200 for generating images of scenes having high dynamic range, in accordance with an example embodiment. Various embodiments of the apparatus are capable of blending two or more images of the scene to generate a blended image that has enhanced image quality as compared to the two or more images. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, along with other components may also be configured to capture light-field images.

These components (202-208) may communicate to each other via a centralized circuit system 210 to generate images of the scene having high dynamic range. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of two or more images of the scene. In some example embodiments, the apparatus 200 may be caused to capture the two or more images of the scene. Alternatively, in some other example embodiments, the images may be prerecorded, stored in the apparatus 200, or may be received from sources external to the apparatus 200. In such example embodiments, the apparatus 200 is caused to receive the images from external storage medium such as digital video disk (DVD), compact disk (CD), flash drive, memory card, or received from external storage locations through Internet, Bluetooth®, and the like. In various example embodiments, the scene may include one or more objects including their surrounding environment that may be captured by the media capture element. For instance, a person or a gathering of individuals, birds, books, a playground, natural scenery, such as a mountain, beach, sun and the like. Some objects of the scene may be part of a foreground and/or some objects of the scene may be part of the background in the scene, and there may be wide (or high) dynamic range information in the scene. It should be noted that a high dynamic range may exist in the scene due to considerable difference in brightness levels of objects present in background and/or foreground regions in the scene.

The apparatus 200 is caused to facilitate receipt of the two or more images of the scene, where the two or more images are associated with different capture parameters. An example of the capture parameter is exposure for capturing images. Another example of the capture parameter is sensor gains Examples of the sensor gains may include analog and/or digital gains. Another example of the capture parameter may be a combination of the exposure and the sensor gains. As such, it should also be noted that the capture parameter may include any other parameter or setting associated with image sensors/image capturing module that by varying the capture parameter, brightness of the captured image may also be varied. For instance, two images of the scene (image I1 and image I2) may be captured, where image I1 may be captured using an exposure E*K associated with the image capturing module and the image I2 may be captured using the exposure E/K. In some examples, value of K may range between 2 to 4, however it may have other values as well. In some example embodiments, the two or more images (also referred to as 'multiple images') of the scene may be captured in a high dynamic range (HDR) mode by setting different exposure settings for the capture of different images. In some example embodiments, the multiple images may be captured in a continuous manner with varying exposure settings. In some example embodiments, the apparatus 200 includes, or otherwise may access, a media capturing device having the HDR mode and/or continuous mode capable of capturing images with varying exposure settings. In an example embodiment, a processing means may be configured to facilitate receipt of the two or more images of the scene, where the two or more images are associated with different capture parameters. An example of the processing means may include the processor 202, which may be an example of the controller 108, and/or the image sensor 208.

In an example embodiment, the multiple images of the scene are aligned images. In examples, where the images are captured in the HDR mode, some images may not be aligned to each other. In such examples, the multiple images may be aligned with respect to a reference image selected from the multiple images. In such example embodiments, the processor 202 is configured to, with the content of the memory 204, and optionally with other components described herein, to cause the apparatus 200 to perform alignment of the images. In an example embodiment, alignment may be performed using the registration matrices between the images. Some non-exhaustive examples of registration may include global transform or local blocks based registration. Some examples of the global transform may include affine, similarity and/or homography transform.

In an example embodiment, the processor 202 is configured to, with the content of the memory 204, and optionally with other components described herein, to cause the apparatus 200 to determine pixel intensities of a plurality of pixel locations of the two or more images. For instance, at a pixel location (x, y) of the image I1, a pixel intensity I1(x, y) may be determined, and at the pixel location (x, y) of the image I2, a pixel intensity I2(x, y) may be determined. In an example embodiment, I(x, y) is computed for each of the pixel location of the images I1 and I2. For example, if there are 640*480 pixels, for every pixel location I(x, y) (where X varies from 1 to 640 and Y varies from 1 to 480), pixel intensity may be determined. In an example embodiment, a processing means may be configured to determine pixel intensities of a plurality of pixel locations in the two or more images. An example of the processing means may include the processor 202, which may be an example of the controller 108.

In an example embodiment, the apparatus 200 is caused to determine intensity gains at corresponding pixel locations of at least one image pair of the two or more images. For instance, if there are three images I1, I2 and I2, intensity gains at corresponding locations of at least one image pair such as an image pair (I1, I2) and an image pair (I2, I3) may be determined. In an example embodiment, for the image pair (I1, I2), an intensity gain associated with a pixel location is a ratio of a pixel intensity at the pixels location of the first image I1 to a pixel intensity at the pixel location of the second image I2.

For example, for a pixel location (x, y) of the images I1 and I2, a corresponding intensity gain is calculated as per the expression:

$$G(x,y) = I1(x,y)/I2(x,y) \qquad (1)$$

In this example, G(x, y) represents intensity gain at a pixel location (x, y) between the images I1 and I2, I1(x, y) represents pixel intensity at the pixel location (x, y) of the images I1, I2(x, y) represents pixel intensity at the pixel location (x, y) of the images I2, x may vary from 1 to 640 and Y varies from 1 to 480 and it is assumed that the image I1 is captured with a capture parameter (for example, an exposure value E1) that is greater that a capture parameter (for example, an exposure value E2) associated with the image I2. In an example embodiment, a gain histogram may be generated that comprises information of the intensity gains corresponding to a plurality of pixel locations between the images I1 and I2. In an example embodiment, the gain histogram may be generated/determined by calculating the intensity gains corresponding to each pixel location of the images I1 and I2. For example, if there are 640*480 pixels, for every pixel location G(x, y) may be computed (where X varies from 1 to 640 and Y varies from 1 to 480) to generate the gain histogram.

In an example embodiment, the processor 202 is configured to, with the content of the memory 204, and optionally with other components described herein, to cause the apparatus 200 to generate a blended image by blending pixels of images of the at least one image pair based at least on the intensity gains. For example, the blended image may be generated by blending pixels of the at least one image pair such as the image pair (I1, I2) based at least on the intensity gains at corresponding pixel locations of the pixels. In an example embodiment, a pixel associated with a pixel location of the blended image is generated based on blending pixels associated with the pixel location in the at least one image pair. For example, a pixel at a pixel location (x, y) of the blended image is generated by blending a pixel associated with the pixel location (x, y) of the image I1 and a pixel associated with the pixel location (x, y) of the image I2 based on the intensity gain at the pixel location (x, y) of the images I1 and I2. In another example, a pixel at a pixel location (x, y) of the blended image is generated by blending a pixel associated with the pixel location (x, y) of the image I1, a pixel associated with the pixel location (x, y) of the image I2 and a pixel associated with the pixel location (x, y) of the image I3 based on at least one of the intensity gain at the pixel location (x, y) of the images I1 and I2, the intensity gain at the pixel location (x, y) of the images I2 and I3 and the intensity gain at the pixel location (x, y) of the images I1 and I3. In an example embodiment, pixels at the pixel location (x, y) in each of the two or more images may be blended to generate the pixel associated with the pixel location (x, y) of the blended image. In an example embodiment, a processing means may be configured to blend pixels associated the plurality of pixel locations in the two or more images based at least on the pixel intensities to generate the blended image. An example of the processing means may include the processor 202, which may be an example of the controller 108.

In an example embodiment, for blending pixels of an image pair (such as the images I1 and I2), the apparatus 200 is caused to determine a minimum gain threshold and a maximum gain threshold associated with the first image I1 and the second image I2. In an example embodiment, the minimum gain threshold and the maximum gain threshold may be determined based on the gain histogram. In an example embodiment, the minimum gain threshold may be determined as an intensity gain in the gain histogram that is greater than intensity gains corresponding to only a threshold percentage of pixel locations of the total pixel locations. For example, the minimum gain threshold may be determined as an intensity gain value that is greater than intensity gains corresponding to only 1 percent pixels of the total pixel counts (or total pixel locations). In an example embodiment, the maximum gain threshold may be determined as a gain value in the gain histogram that is smaller than intensity gains corresponding to only a threshold percentage of pixel locations of the total pixel locations. For example, the maximum gain threshold may be determined as an intensity gain value that is smaller than intensity gains corresponding to only 0.5 percent pixels of the total pixel counts. In an example embodiment, a processing means may be configured to determine the minimum gain threshold and the maximum gain threshold associated with the first image I1 and the second image I2. An example of the processing means may include the processor 202, which may be an example of the controller 108. In an example embodiment, an intensity gain in the gain histogram may be chosen as the minimum gain threshold, at which a corresponding pixel count crosses (with a positive slope) a minimum threshold pixel count. In an example embodiment, an intensity gain in the gain histogram may be chosen as the maximum gain threshold, at which a corresponding pixel count crosses (with a negative slope) a maximum threshold pixel count.

In an example embodiment, the apparatus 200 is caused to blend the pixels of the image pair (for example, the first image I1 and the second image I2) based at least on the intensity gains at corresponding pixel location of the images I1 and I2, the minimum gain threshold and the maximum gain threshold. For instance, in some example embodiments, pixels corresponding to a pixel location of the first image I1 and the second image I2 may be blended based on the differences of the intensity gain with respect to the minimum gain threshold and the maximum gain threshold. In an example embodiment, a processing means may be configured to blend the pixels in the first image and the second image based at least on the pixel intensities of the pixels, the minimum gain threshold and the maximum gain threshold. An example of the processing means may include the processor 202, which may be an example of the controller 108.

In an example embodiment, the apparatus 200 is caused to determine intensity scaling factors associated with pixel locations of the first image of the image pair and the second image of the image pair for blending the pixels of the first image and the second image. It should be noted that the apparatus 200 is caused to perform intensity normalization of two images using the intensity scaling factors. In an example embodiment, the apparatus 200 is caused to determine an intensity scaling factor associated with a pixel location of the first image I1 and an intensity scaling factor associated with the pixel location of the second image I2 based on an intensity gain at the pixel location between the first image I1 and the second image I2. In an example embodiment, a processing means may be configured to determine intensity scaling factors associated with pixel locations of the first image and the second image for blending the pixels of the first image and the second image. An example of the processing means may include the processor 202, which may be an example of the controller 108.

In an example embodiment, for each pixel location of the two images I1 and I2, an intensity scaling factor may be determined. The intensity scaling factors for the images I1 and I2 may be determined as per the following expressions:

$$s1(x,y)=(1/G(x,y))^\wedge n; \text{ and}$$

$$s2(x,y)=(G(x,y))^\wedge n \qquad (2)$$

where s1(x, y) is an intensity scaling factor associated with a pixel location (x, y) of the image I1, s2(x, y) is an intensity scaling factor associated with a pixel location (x, y) of the image I2, and G(x, y) is the intensity gain ratio between a pixel location (x, y) of the image I1 and a pixel location (x, y) of the image I2. In an example embodiment, value of n may be equal to ½. In some other example embodiments, the value of n may be any other value, and it may depend upon the differences in the capture parameters associated with the images I1 and I2. It should be noted that the image I1 may be scaled down based on the intensity scaling factor s1(x, y) and the image I2 may be scaled up based on the intensity scaling factor s2(x, y).

In an example embodiment, the processor 202 is configured to, with the content of the memory 204, and optionally with other components described herein, to cause the apparatus 200 to determine weights corresponding to pixel locations in the first image I1 and the second image I2. In an example embodiment, for each pixel location of the two images I1 and I2, a weight may be determined. In an example embodiment, weight corresponding to a pixel location (x, y) in the images I1 and I2 may be determined using the intensity gain G(x, y) corresponding to the pixel location (x, y), the minimum gain threshold and the maximum gain threshold associated with the images I1 and I2. For example, a weight corresponding to a pixel location (200, 250) in the image I1 (higher exposure image) and the weight corresponding to the pixel location (200, 250) in the image I2 (lower exposure image) may be determined based on the G(200, 250) (where G(200, 250)=I1(200, 250)/I2(200, 250)), and the minimum gain threshold (g_min) and the maximum gain threshold (g_max) for the images I1 and I2. In an example embodiment, a processing means may be configured to determine weights corresponding to pixel locations in the first image I1 and the second image I2. An example of the processing means may include the processor 202, which may be an example of the controller 108.

In an example, it may be assumed that the image I1 is a high exposure image and the image I2 is a low exposure image, w1(x, y) represents the weight associated with the pixel location (x, y) of the high exposure image (I1) and w2(x, y) represents the weight associated with the pixel location (x, y) of the high exposure image (I2). In an example embodiment, w1(x, y) and w2(x, y) are determined as normalized weights, such that they add to 1 (for example, w1(x, y)+w2(x, y)=1).

In an example embodiment, if at a pixel location (x, y) of the images I1 or I2, the intensity gain G(x, y) is less than the minimum gain threshold (for example, G(x, y)<g_min), w1(x, y) may be equal to 0 and w2 (x, y) may be equal to 1. It should be noted that the pixel associated with the pixel location (x, y) of the high exposure image I1 may be saturated if G(x, y) is less than the g_min, and accordingly, the weight associated with the pixel location (x, y) of the image I1 may be determined as equal to 0, and a weight associated with the pixel location (x, y) of the image I2 may be determined as equal to 1. In an example embodiment, if at a pixel location (x, y) of the images I1 or I2, the intensity gain G(x, y) is more than the maximum gain threshold (for example, G(x, y)>g_max), w1(x, y) may be determined as equal to 1 and w2(x, y) may be determined as equal to 0. It should be noted that the pixel associated with the pixel location (x, y) in the low exposure image I2 may be unreliable, if G(x, y) is more than the g_max, and accordingly, the weight corresponding to the pixel location (x, y) of the image I1 may be determined as equal to 1, and a weight corresponding to the pixel location (x, y) of the image I2 may be determined as equal to 0.

In an example embodiment, if at the pixel location (x, y) in the images I1 or I2, the intensity gain G(x, y) is in the range between g_min and g_max, the weights vary linearly according to following expression:

$$w2(x,y)=(g\_max-G(x,y)/(g\_max-g\_min); \text{ and}$$

$$w1(x,y)=1-W2(x,y) \qquad (3)$$

In an example embodiment, the processor 202 is configured to, with the content of the memory 204, and optionally with other components described herein, to cause the apparatus 200 to blend pixels of the images I1 and I2 based at least on the intensity scaling factors and the weights corresponding to the pixel locations of the pixels. For example, for the pixel location (x, y), a pixel O(x, y) of the final output image O is computed using the expression:

$$O(x,y)=s1(x,y)*w1(x,y)*I1(x,y)+s2(x,y)*w2(x,y)*I2(x,y) \qquad (4)$$

It should be noted that the output image O is generated based on blending a plurality of corresponding pixel locations of the images I1 and I2. In some example embodiment, the output image O may be generated based on blending each of the corresponding pixel locations of the images I1 and I2 based on the expression (4).

Some example embodiments of the generation of blended images are further described in reference to FIGS. 3A-5. FIGS. 3A-5 represent one or more example embodiments only, and should not be considered limiting to the scope of the various example embodiments.

Figure 3A:
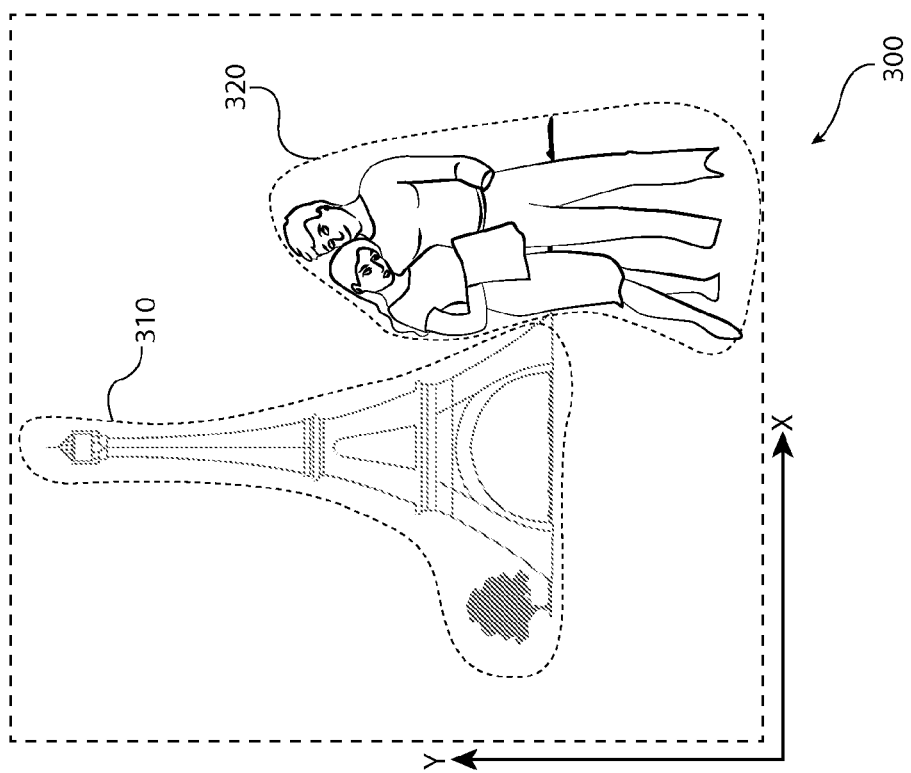

FIGS. 3A and 3B illustrate images 300 and 350 of a scene, in accordance with an example embodiment. It may be assumed that the image 300 is captured using an exposure E1 and the image 350 is captured using an exposure E2, where E1 is quantitatively more than E1. It may be noted that the region 310 in the image 300 is more saturated as compared to a corresponding region 360 in the image 350, the brightness of the region 320 in the image 300 is also more than a corresponding region 370 in the image 350. It may be noted that pixel locations of the region 370 may be unreliable. Various example embodiments provide blending of pixels at various pixel locations of the images 300 and 350 based on the intensity gains at the corresponding pixel locations of the images 300 and 350.

Figure 4:
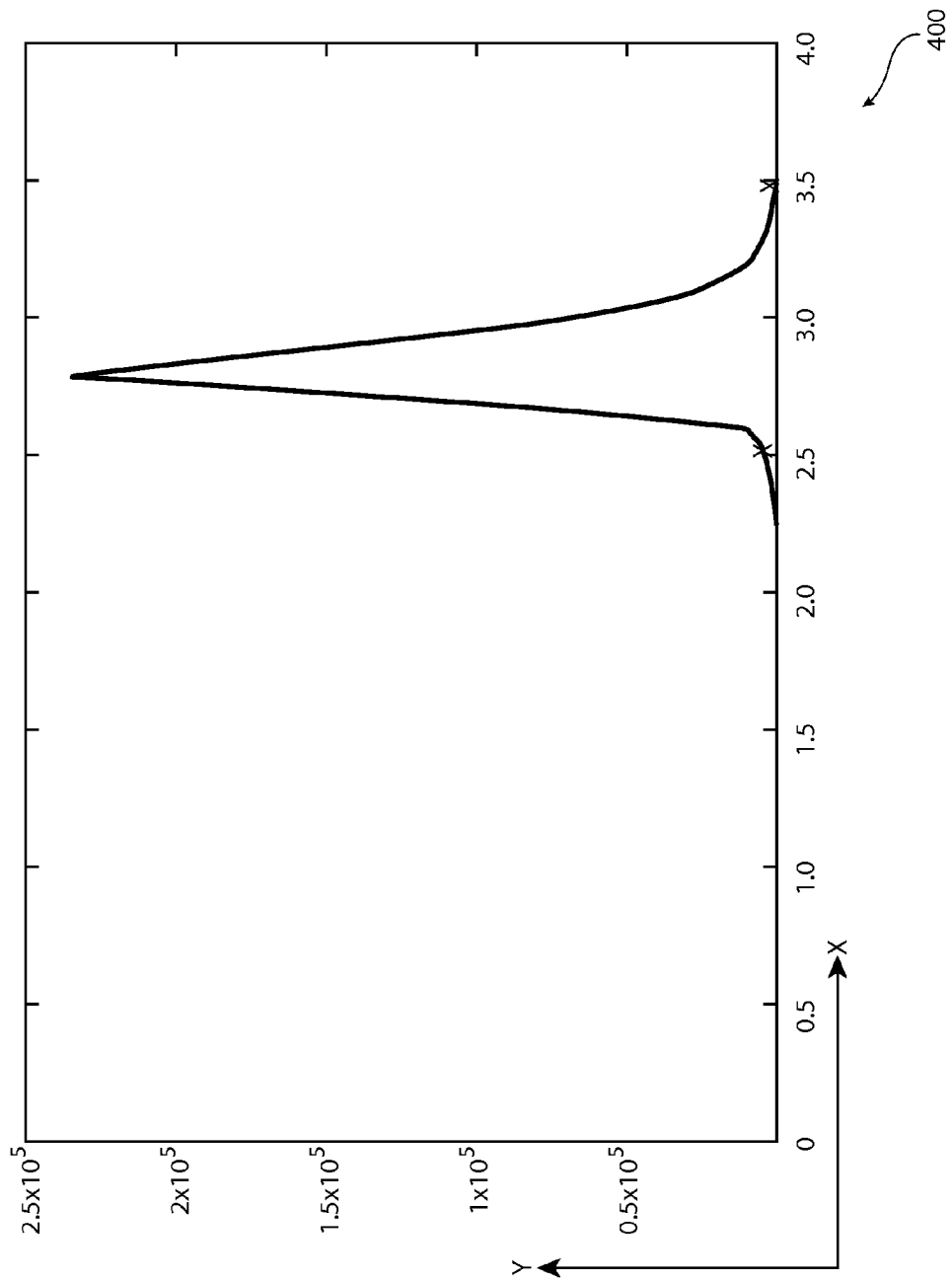
FIG. 4 illustrates a gain histogram, in accordance with an example embodiment.

FIG. 4 represents a gain histogram 400, in accordance with an example embodiment. It may be assumed that the gain histogram 400 is computed for the two images 300 (for example, image I1) and 350 (for example, image I2). In the example embodiment shown in FIG. 4, the gain histogram 400 is a plot of a variation of pixel counts (on Y-axis) with respect to intensity gains (on X-axis). In some example embodiments, using the gain histogram 400, the minimum gain threshold and the maximum gain threshold may be computed.

In an example embodiment, the minimum gain threshold and the maximum gain threshold may be computed using one or more threshold percentages of pixel counts in the gain histogram 400. In an example embodiment, an intensity gain value may be selected as the minimum gain threshold such that intensity gains of only 1 percent of the total pixel count in the gain histogram 400 is less than the selected intensity gain. For instance, intensity gain of 2.5 may be selected as the minimum gain threshold that is greater than intensity gains corresponding to 1 percent pixels of the total pixel count. In an example embodiment, an intensity gain value may be selected as the maximum gain threshold such that intensity gains of only 0.5 percent of the total pixel count in the gain histogram 400 is more than the selected intensity gain. For instance, intensity gain of 3.5 may be selected as the maximum gain threshold that is smaller than intensity gains corresponding to only 0.5 percent pixels of the total pixel count.

Figure 5:
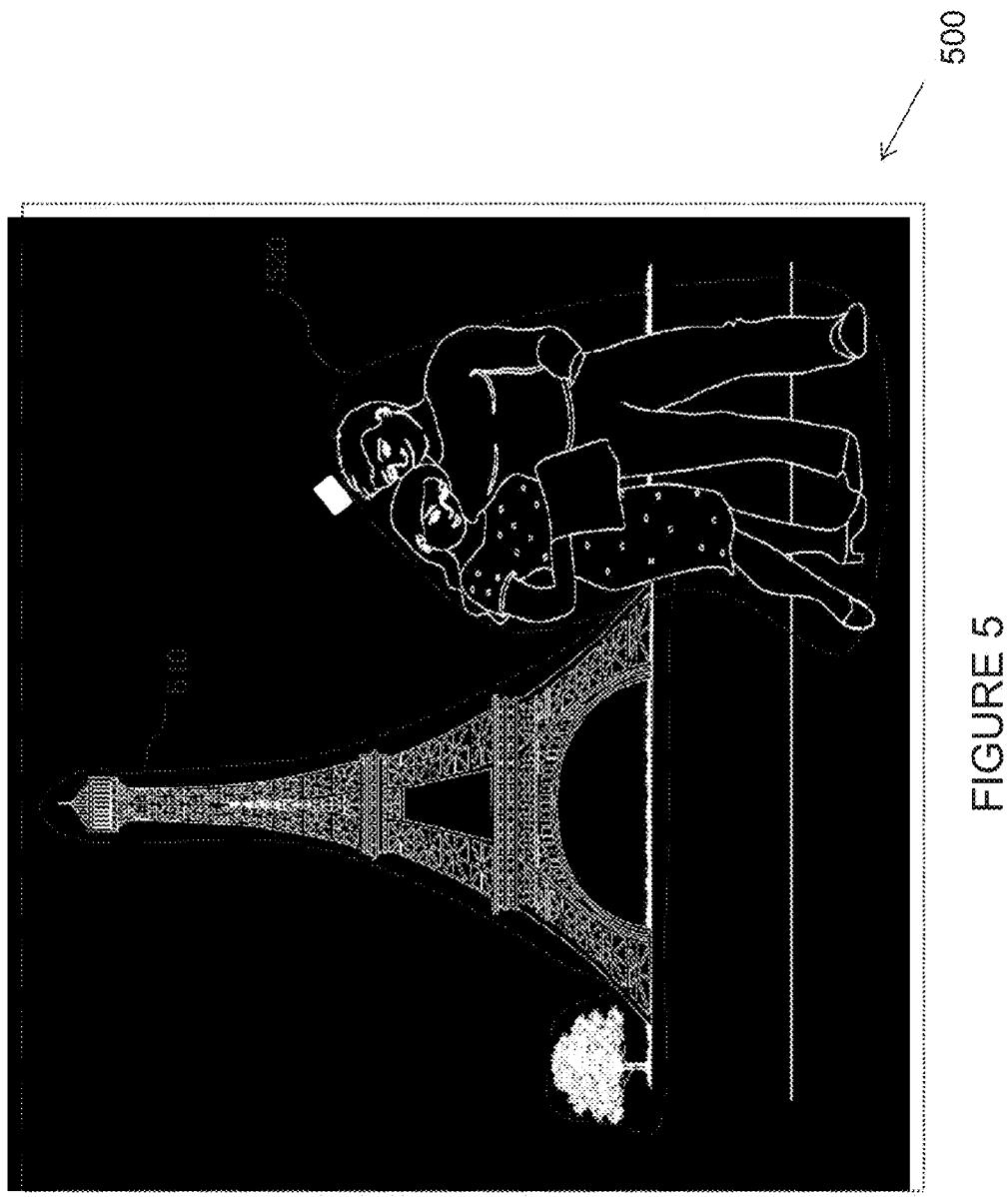
FIG. 5 represents a blended image generated from the images of the scene, in accordance with an example embodiment.

FIG. 5 represents a blended image 500, in accordance with an example embodiment. In an example embodiment, the blended image 500 may be generated by blending pixels of the image 300 and the image 350. For instance, a pixel associated with a pixel location (x, y) of the image 300 is blended with a pixel associated with a pixel location (x, y) of the image 350 to generate a pixel associated with the pixel location (x, y) of the blended image 500. In an example embodiment, if there are 640*480 pixels in the images 300 and 350, for each pixel location (x, y) (where x varies from 1 to 640 and y varies from 1 to 480) corresponding pixels of the images 300 and 350 are blended to generate the image 350.

In the example representation of FIG. 5, pixels of a region 510 of the image 500 are generated by blending corresponding pixels in the regions 310 and 360 of the images 300 and 350, respectively, and pixels of a region 520 of the image 500 are generated by blending corresponding pixels in the regions 320 and 370 of the images 300 and 350, respectively. It should be noted that by comparing the images 300 and 350 with the image 500, it may be visible that the details of the image 500 are clear and have increased brightness levels as compared to the images 300 and 350.

It should be noted that as the blended image 500 is explained by taking examples of two images 300 and 350, however, in various example embodiments, pixels of the multiple images may be blended to generate a blended image such as the blended image 500. In an example, there may be three images, for example, images I1, I2 and I3, used for generating a blended image such as the blended image 500. It may be assumed that the images I1, I2 and I3 are captured using exposures varying from high exposure to low exposure. In an example embodiment, the apparatus 200 is caused to determine intensity scaling factors s1, s2, and s3 corresponding to the images I1, I2 and I3, respectively, based on the intensity gains between at least one image pair of the images I1, I2 and I3. In an example embodiment, the apparatus 200 is caused to determine weights w1, w2, and w3 corresponding to the images I1, I2 and I3, respectively, based on the intensity gains at corresponding pixel locations of image pairs of the images I1, I2 and I3.

In an example embodiment, pixels of the images I1, I2 and I3 at a pixel location (x, y) may be blended as per the following expression:

$$O(x,y)=I1(x,y)*w1(x,y)*s1(x,y)+I2(x,y)*w2(x,y)*s2(x,y)+I3(x,y)*w3(x,y)*s3(x,y) \quad (5)$$

where w1(x, y), w2(x, y) and w3(x, y) represent weights associated with pixels at the pixel location (x, y) of the images I1, I2 and I3, respectively, and s1(x, y), s2(x, y) and s3(x, y) represent the intensity scaling factors associated with pixels at the pixel location (x, y) of the images I1, I2 and I3.

In an example embodiment, the apparatus 200 is caused to determine values of s1(x, y), s2(x, y), s3(x, y) and w1(x, y), w2(x, y), w3(x, y) in a variety of ways. In an example embodiment, the apparatus 200 is caused to select an image as a base image such as the image I2 among the images I1, I2 and I3, and determine gain histograms for an image pair I1 and I2 and an image pair I2 and I3 for determining the intensity scaling factors and the weights. In an example embodiment, the apparatus 200 is caused to determine pixel-wise gain ratio between the image pair I1 and I2, and between the image pair I2 and I3 as per the following expression:

$$G12(x,y)=I1(x,y)/I2(x,y); \text{ and}$$

$$G23(x,y)=I2(x,y)/I3(x,y) \quad (6)$$

In the above expression, G12(x, y) represents the pixel-wise gain ratio between the images I1 and I2 at the pixel location (x, y), and G23(x, y) represents the pixel-wise gain ratio between the images I2 and I3 at the pixel location (x, y).

In an example embodiment, the computation of s1, s3 and s3 may be done based on the fact that using the intensity scaling factors s1, s3 and s3, intensities of the images I1, I2 and I3 may be normalized, for example may be changed to a same intensity level. In an example embodiment, an image, such as, the image I2 may be considered as a reference image, and a pixel location of the other images I1 and I2 may be brought to same intensity level of a corresponding pixel location of images I2 and may be blended with the image I2. In an example embodiment, intensity scaling factor (s2) corresponding to pixels of the images I2 may be considered as equal to one. Without limiting the scope of example embodiments, in an example, the intensity scaling factors for the pixel location (x, y) of the images I1, I2 and I3 may be computed as per the expression:

$$s1(x,y)=1/G12(x,y);$$

$$s2(x,y)=1; \text{ and}$$

$$s3(x,y)=G23(x,y) \quad (7)$$

In the example of three images, weights (w1(x, y), w2(x, y) or w3(x, y)) corresponding to the pixel location (x, y) of an image (I1, I2 or I3) may depend upon the intensity gain at the pixel location (x, y) with respect to corresponding pixel locations (x, y) in one or more of the remaining images, and the minimum gain threshold and the maximum gain threshold. In an example embodiment, if a pixel associated with a pixel location in an image is saturated or has very low intensity level, its weight may be determined as zero. For example, if an intensity of the pixel location in the image is less than a minimum threshold intensity or greater than a maximum threshold intensity, its weight may be considered as zero. It may be noted that while blending the pixels of the multiple images, only the pixels having intensities in a valid range (i.e., pixels that are not saturated and are not at very low intensity levels), may contribute towards the pixels in the output image (O). For example, if the minimum threshold intensity is 15 and the maximum threshold intensity is 230, a valid pixel intensity range is between 15 and 230. In this example, weights corresponding to pixels locations having pixel intensities less than 15 or more than 230 are determined as zero.

In an example embodiment, a pair of images of the multiple images, for example, images I2 and I3 may be selected and a gain histogram is computed for the pixel locations of the images I2 and I3. In an example embodiment, the apparatus 200 is caused to determine a minimum gain threshold and a maximum gain threshold from the gain histogram. In an example embodiment, at a pixel location (x, y), weights in the images I3 and I2 may be computed as per the following expressions:

$$w3(x,y) = (g23\_max - G23(x,y))/(g23\_max - g23\_min) \quad (8); \text{ and}$$

$$w23(x,y) = 1 - w3(x,y); \quad (9)$$

In the above expression, w3(x, y) represents weight associated with the pixel location (x, y) of the image I3, and w23(x, y) represents weight associated with the pixel location (x, y) in the image I2 with respect to image I3, and g23_min represents the minimum gain threshold and g23_max represents the maximum gain threshold in the gain histogram for the images I2 and I3.

In an example embodiment, a next pair of images, for example, the images I1 and I2 are selected, and gain histogram is computed for the pixel locations of the images I1 and I2. In an example embodiment, the apparatus 200 is caused to determine a minimum gain threshold and a maximum gain threshold from the gain histogram. In an example embodiment, at a pixel location (x, y), the weights in the images I2 and I1 may be determined as per the following expressions:

$$w21(x,y) = (g12\_max - G12(x,y))/(g12\_max - g12\_min) \quad (10); \text{ and}$$

$$w1(x,y) = 1 - w21(x,y) \quad (11)$$

In the above expressions, w1(x, y) represents weight associated with the pixel location (x, y) of the image I1, and w21(x, y) represents weight associated with the pixel location (x, y) in the image I2 with respect to the image I1, g12_min represents the minimum gain threshold and g12_max represents the maximum gain threshold in the gain histogram between the images I2 and I1.

In an example embodiment, weights (w1, w2 and w3) may be determined based on the expressions (8) to (11). For instance, if (w3(x, y) and w23(x, y) are greater than 0 and pixel intensities of the pixels in the I2 and I3 are in valid range, weights may be determined as per the following expressions:

$$w1(x,y) = 0.5 * w1(x,y);$$

$$w2(x,y) = 0.5 * w12(x,y) + 0.5 * w23(x,y); \text{ and}$$

$$w3(x,y) = 0.5 * w3(x,y); \quad (12)$$

In an example embodiment, if a pixel location (x, y) in the image I2 is saturated, it may be assumed that due to exposure relation a corresponding pixel in the image I1 may also be saturated. In such example embodiment, weights may be determined as per the following expression:

$$w3(x,y) = 1; w1(x,y) = 0; \text{ and } w2(x,y) = 0 \quad (13)$$

In an example embodiment, if a pixel location (x, y) in the image I3 is of very low intensity level, and is not reliable, the weights may be determined as per the following expression:

$$w3(x,y) = 0; w2(x,y) = w21(x,y); \text{ and } w1(x,y) = 1 - w21(x,y); \quad (14)$$

It may be noted that at any pixel location, sum of weights of the pixels in the images I1, I2 and I3 is maintained as equal to 1.

In some example embodiments, the multiple images of a scene may be captured with different exposures setting, and various combinations of these images may be used for generating a blended image. For instance, in an example, four images I1, I2, I3 and I4 are captured with exposure settings E1, E2, E3 and E4 in a decreasing order of exposure (for instance, E1>E2>E3>E4). In this example, pixels of the images I1 and I2 may be blended based on the expression (4) to generate a blended image B1, pixels of the images I3 and I4 may be blended based on the expression (4) to generate a blended image B2. In this example embodiment, the blended images B1 and B2 are again blended based on the expression (4) to generate a final blended image B. In this manner, different combinations of the multiple images may be blended to generate the final blended image B.

Figure 6:
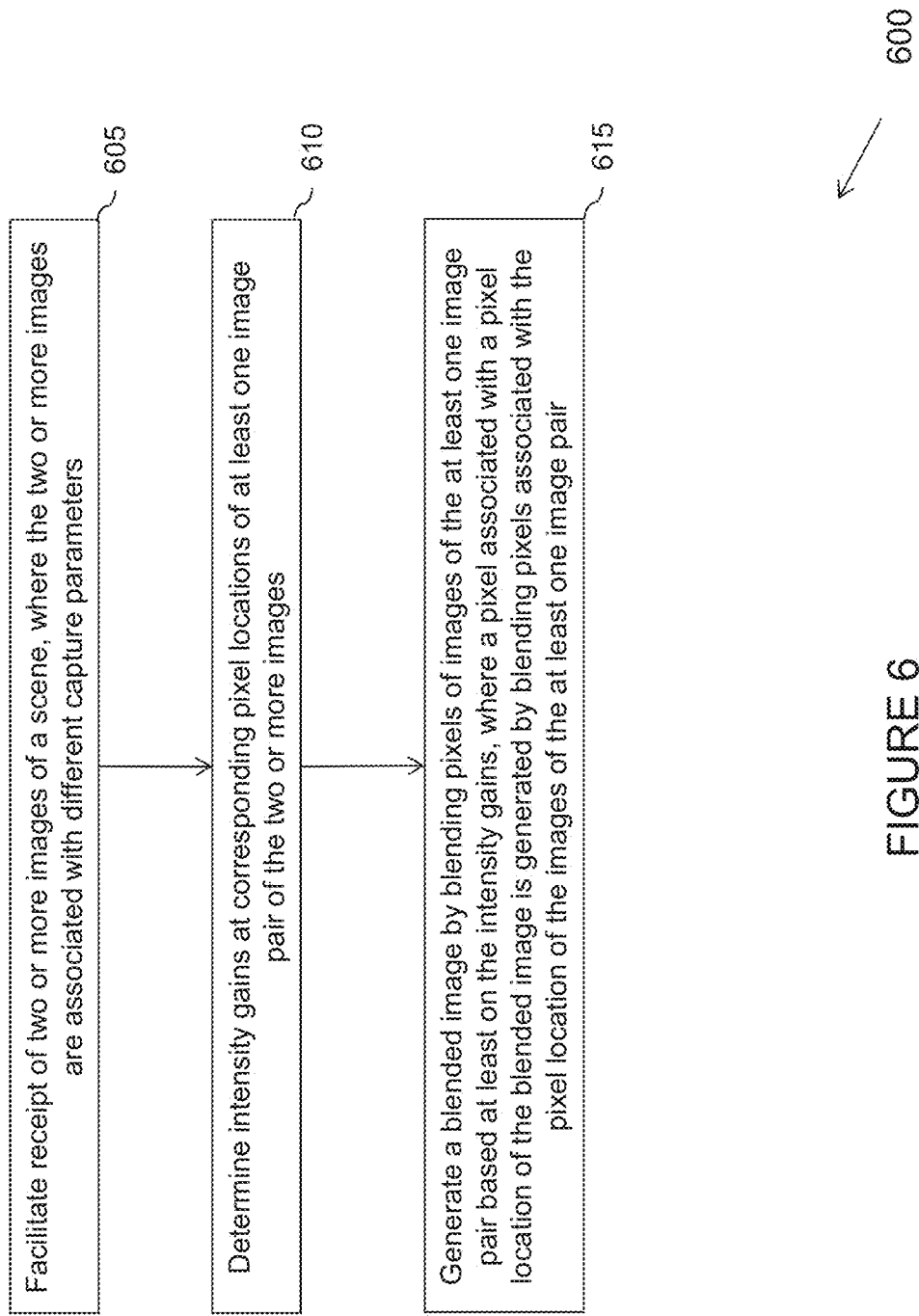
FIG. 6 is a flowchart depicting an example method for generating image of a scene having high dynamic range, in accordance with an example embodiment.

FIG. 6 is a flowchart depicting an example method 600 for generating image of a scene having high dynamic range, in accordance with an example embodiment. The method 600 depicted in the flow chart may be executed by, for example, the apparatus 200 of FIG. 2.

At block 605, the method 600 includes facilitating receipt of two or more images of a scene. As described in reference to FIG. 2, these images of the scene may be received from a media capturing device embodied or otherwise accessible to the apparatus 200, or from external sources such as DVD, CD, flash drive, memory card, or received from external storage locations through Internet, Bluetooth®, and the like. In an example embodiment, the two or more images are associated with different capture parameters. An example of the capture parameter may include an exposure or a sensor gain, or a combination of the exposure and the sensor gain.

At block 610, the method 600 includes determine intensity gains at corresponding pixel locations of at least one image pair of the two or more images. For instance, if there are three images I1, I2 and I2, intensity gains at corresponding locations of at least one image pair such as of image pair (I1, I2) and image pair (I2, I3) may be determined. In an example embodiment, for the image pair (I1, I2), an intensity gain associated with a pixel location is a ratio of a pixel intensity at the pixel location of the first image I1 to a pixel intensity at the pixel location of the second image I2. For instance, for a pixel location (x, y), an intensity gain between images I1 and I2 may be determined by a ratio of the I1(x, y) and I2(x, y). In an example embodiment, the intensity gain is determined for each pixel location (x, y) of different image pairs of the two or more images.

At block 615, the method 600 includes generating a blended image by blending pixels of images of the at least one image pair based at least on the intensity gains. For example, the blended image may be generated by blending pixels of the at least one image pair such as the image pair (I1, I2) based at least on the intensity gains at corresponding pixel locations of the pixels. In an example embodiment, a pixel associated with a pixel location of the blended image is generated based on blending pixels associated with the pixel location in the at least one image pair. In an example, a pixel at a pixel location (x, y) of the blended image is generated by blending a pixel associated with the pixel location (x, y) of the image I1 and a pixel associated with the pixel location (x, y) of the image I2 based on the intensity gain at the pixel location (x, y) of the images I1 and I2. In an example embodiment, pixels at the pixel location (x, y) in each of the two or more images may be blended to generate a pixel associated with the pixel location (x, y) of the blended image.

Figure 7:
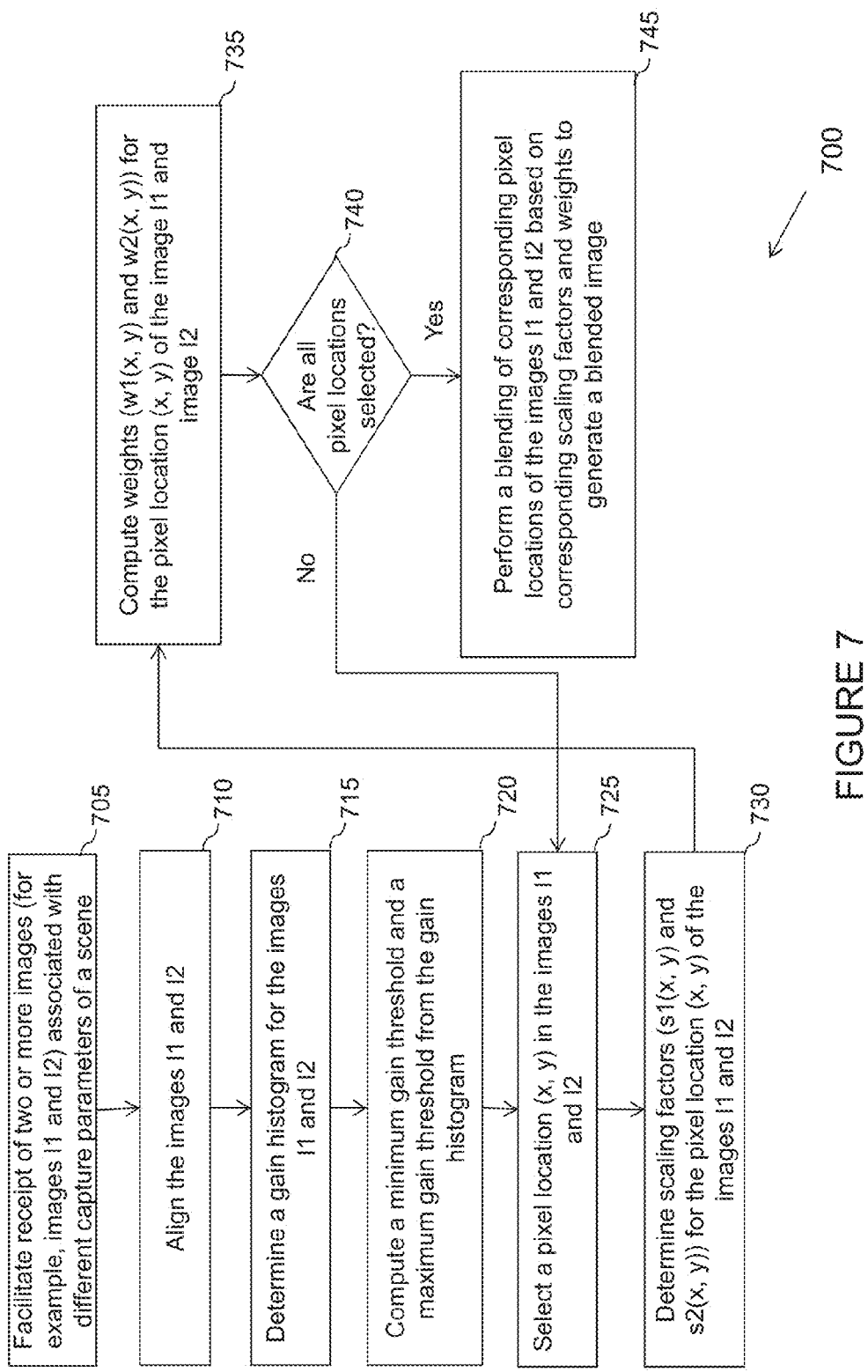
FIG. 7 is a flowchart depicting an example method for generating image of the scene having high dynamic range, in accordance with another example embodiment

FIG. 7 is a flowchart depicting example method 700 for generating image of a scene having high dynamic range, in accordance with another example embodiment. The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of the apparatus 200. However, the operations of the methods can be described and/or practiced by using any other apparatus.

At block 705, the method 700 includes facilitating receipt of two or more images of the scene, where images are associated with different exposures. For instance, two images of the scene (image I1 and image I2) are captured, where image I1 may be associated with a capture parameter (for example, captured using an exposure E1 and/or sensor gain G1 associated with the image capturing module capturing the image I1) and the image I2 may be associated with a capture parameter (for example, captured using the exposure E2 and/or sensor gain G2 associated with the image capturing module capturing the image I2).

At block 710, the method 700 includes aligning the images I1 and I2. As described in reference to FIG. 2, alignment may be performed using the registration matrices between the images I1 and I2. At block 715, a gain histogram is determined or generated for the images I1 and I2. In an example, it may be assumed that the capture parameter associated with the image I1 is more than the capture parameter associated with the image I2. In this example, the gain histogram may be determined by calculating the intensity gains for every pixel location of the images I1 and I2. In an example embodiment, the gain histogram may include information of a variation of pixel counts with respect to intensity gain.

At block 720, the method 700 includes computing a minimum gain threshold and a maximum gain threshold from the gain histogram. In an example embodiment, the minimum gain threshold and the maximum gain threshold may be determined based on the gain histogram. In an example embodiment, the minimum gain threshold and the maximum gain threshold may be computed using one or more threshold percentages of pixel counts in the gain histogram. In an example embodiment, an intensity gain value may be selected as the minimum gain threshold such that intensity gains of only 1 percent of the total pixel count in the gain histogram is less than the selected intensity gain. In an example embodiment, an intensity gain value may be selected as the maximum gain threshold such that intensity gains of only 0.5 percent of the total pixel count in the gain histogram is more than the selected intensity gain.

At block 725, the method 700 includes selecting a pixel location (x, y) in the images I1 and I2. At block 730, the method 700 includes determining intensity scaling factors (s1(x, y) and s2(x, y)) for the pixel location (x, y) of the images I1 and I2, respectively. In an example embodiment, the intensity scaling factors for the pixel location (x, y) of the images I1 and I2 may be a function of the intensity gains at the pixel location (x, y). The intensity scaling factor s1(x, y) and s1(x, y) may be determined based on the expression (2) described in reference to FIG. 2.

At block 735, the method 700 includes computing weights (w1(x, y) and w2(x, y)) for the pixel location (x, y) of the image I1 and image I2. In an example embodiment, the weights may be determined based on the expression (3) described in reference to FIG. 2.

In an example embodiment, the intensity scaling factors (s1(x, y) and s1(x, y)) and the weights (w1(x, y) and w2(x, y)) may be determined/computed for each pixel location of the images I1 and I2. At block 740, it is checked whether all pixel locations of the images I1 and I2 are selected, and the intensity scaling factors and the weights are determined. If it is determined that all pixel locations are not selected, the method 700 proceeds to the block 725, and a next pixel location is selected, and operations of the blocks 730 and 735 are performed. If it is determined that the each pixel location of the images I1 and I2 are selected, the method 700 proceeds to the block 745.

At block 745, in an example embodiment, the method 700 includes performing a blending of the matching pixel location of the image I1 and I2 based on corresponding intensity scaling factors and weights to generate a blended image. It should be noted that a blended image (output image O) is generated based on blending a plurality of corresponding pixel locations of the images I1 and I2. In some example embodiment, the output image O may be generated based on blending each pixel location of the images I1 with corresponding pixel location of the image I2 based on the expression (4) as described in reference to FIG. 2.

To facilitate discussions of the method 700 of FIG. 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the method 700 are performed in an automated fashion. These operations involve substantially no interaction with the user. Other operations of the methods 700 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to generate images of scenes having high dynamic range. Various embodiments perform blending of the images based on the pixel-wise intensity gains, and use weights and intensity scaling factors for blending the pixels. For instance, pixels corresponding to a pixel location in the multiple images may be scaled-up or scaled-down based on the intensity scaling factors before blending the pixels. Further, weights corresponding to the pixel locations are computed such that a reliable pixel is given more weight as compared to a pixel that is saturated, or of very low intensity. Various embodiments provide blended image (output image) which have improved contrast, colors and lighting owing to pixel level operation.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   facilitating receipt of two or more images of a scene, the two or more images being associated with different capture parameters;
   determining intensity gains at corresponding pixel locations of at least one image pair of the two or more images; and
   generating a blended image by blending pixels of images of the at least one image pair based at least on the intensity gains, wherein a pixel associated with a pixel location of the blended image is generated by blending pixels associated with the pixel location of the images of the at least one image pair, wherein blending pixels of an image pair of the at least one image pair comprises:
      computing a minimum gain threshold and a maximum gain threshold associated with the image pair based on intensity gains at corresponding pixel locations of the image pair; and
      blending the pixels of the image pair based at least on the intensity gains at corresponding pixel locations of the pixels, the minimum gain threshold and the maximum gain threshold.

2. The method as claimed in claim 1, further comprising aligning the two or more images.

3. The method as claimed in claim 1, further comprising generating a gain histogram, wherein the gain histogram includes information of a variation of pixel counts with respect to the intensity gains.

4. The method as claimed in claim 1, wherein computing the minimum gain threshold comprises one of:
   selecting an intensity gain as the minimum gain threshold such that the selected intensity gain is more than intensity gains corresponding to only a threshold percentage of total pixel locations; and
   selecting an intensity gain as the maximum gain threshold such that the selected intensity gain is less than intensity gains corresponding to only a threshold percentage of total pixel locations.

5. The method as claimed in claim 1, wherein blending the pixels of the image pair based at least on the intensity gains at corresponding pixel location of the pixels, the minimum gain threshold and the maximum gain threshold, comprising:
   determining an intensity scaling factor associated with a pixel location of a first image of the image pair and an intensity scaling factor associated with the pixel location of a second image of the image pair based on an intensity gain at the pixel location between the first image and the second image;
   determining a weight associated with the pixel location of the first image and a weight associated with the pixel location of the second image based at least on the intensity gain at the pixel location between the first image and the second image, the minimum gain threshold and the maximum gain threshold associated with the first image and the second image; and
   blending the pixel associated with the pixel location of the first image and the pixel associated with the pixel location of the second image based at least on the intensity scaling factor and the weight.

6. The method as claimed in claim 5, wherein if the intensity gain corresponding to the pixel location is less than the minimum gain threshold, the weight associated with the pixel location of the first image is zero and the weight associated with the pixel location of the second image is one, wherein a capture parameter associated with the first image is more than a capture parameter associated with the second image.

7. The method as claimed in claim 6, wherein if the intensity gain corresponding to the pixel location is more than the maximum gain threshold, the weight associated with the pixel location of the first image is one and the weight associated with the pixel location of the second image is zero, wherein a capture parameter associated with the first image is more than a capture parameter associated with the second image.

8. An apparatus comprising:
   at least one processor; and
   at least one memory comprising computer program code, the at least one memory and the computer program code configured to, with the at least one processor, cause the apparatus to at least perform:
      facilitate receipt of two or more images of a scene, the two or more images being associated with different capture parameters;
      determine intensity gains at corresponding pixel locations of at least one image pair of the two or more images; and
      generate a blended image by blending pixels of images of the at least one image pair based at least on the intensity gains, wherein a pixel associated with a pixel location of the blended image is generated by blending pixels associated with the pixel location of the images of the at least one image pair, wherein for blending pixels of an image pair of the at least one image pair, the apparatus is further caused, at least in part to:

compute a minimum gain threshold and a maximum gain threshold associated with the image pair based on intensity gains at corresponding pixel locations of the image pair; and blend the pixels of the image pair based at least on the intensity gains at corresponding pixel locations of the pixels, the minimum gain threshold and the maximum gain threshold.

9. The apparatus as claimed in claim 8, wherein, the apparatus is further caused, at least in part to align the two or more images.

10. The apparatus as claimed in claim 8, wherein, the apparatus is further caused, at least in part to generate a gain histogram, wherein the gain histogram includes information of a variation of pixel counts with respect to the intensity gains.

11. The apparatus as claimed in claim 8, wherein for computing the minimum gain threshold, the apparatus is further caused, at least in part to perform one of:

select an intensity gain as the minimum gain threshold such that the selected intensity gain is more than intensity gains corresponding to only a threshold percentage of total pixel locations; and select an intensity gain as the maximum gain threshold such that the selected intensity gain is less than intensity gains corresponding to only a threshold percentage of total pixel locations.

12. The apparatus as claimed in claim 8, wherein for blending the pixels of the image pair based at least on the intensity gains at corresponding pixel location of the pixels, the minimum gain threshold and the maximum gain threshold, the apparatus is further caused, at least in part to:

determine an intensity scaling factor associated with a pixel location of a first image of the image pair and an intensity scaling factor associated with the pixel location of a second image of the image pair based on an intensity gain at the pixel location between the first image and the second image;

determine a weight associated with the pixel location of the first image and a weight associated with the pixel location of the second image based at least on the intensity gain at the pixel location between the first image and the second image, the minimum gain threshold and the maximum gain threshold associated with the first image and the second image; and blend the pixel associated with the pixel location of the first image and the pixel associated with the pixel location of the second image based at least on the intensity scaling factor and the weight.

13. The apparatus as claimed in claim 12, wherein if the intensity gain corresponding to the pixel location is less than the minimum gain threshold, the weight associated with the pixel location of the first image is zero and the weight associated with the pixel location of the second image is one, wherein a capture parameter associated with the first image is more than a capture parameter associated with the second image.

14. The apparatus as claimed in claim 12, wherein if the intensity gain corresponding to the pixel location is more than the maximum gain threshold, the weight associated with the pixel location of the first image is one and the weight associated with the pixel location of the second image is zero, wherein a capture parameter associated with the first image is more than a capture parameter associated with the second image.

15. A non-transitory computer readable medium comprising a set of instructions, which, when executed by one or more processors, cause an apparatus to at least perform:

facilitate receipt of two or more images of a scene, the two or more images being associated with different capture parameters;

determine intensity gains at corresponding pixel locations of at least one image pair of the two or more images; and generate a blended image by blending pixels of images of the at least one image pair based at least on the intensity gains, wherein a pixel associated with a pixel location of the blended image is generated by blending pixels associated with the pixel location of the images of the at least one image pair, wherein for blending pixels of an image pair of the at least one image pair, the apparatus is further caused, at least in part to:

compute a minimum gain threshold and a maximum gain threshold associated with the image pair based on intensity gains at corresponding pixel locations of the image pair; and blend the pixels of the image pair based at least on the intensity gains at corresponding pixel locations of the pixels, the minimum gain threshold and the maximum gain threshold.

16. The non-transitory computer readable medium as claimed in claim 15, wherein, the apparatus is further caused, at least in part to align the two or more images.

17. The non-transitory computer readable medium as claimed in claim 15, wherein for blending the pixels of the image pair based at least on the intensity gains at corresponding pixel location of the pixels, the minimum gain threshold and the maximum gain threshold, the apparatus is further caused, at least in part to:

determine an intensity scaling factor associated with a pixel location of a first image of the image pair and an intensity scaling factor associated with the pixel location of a first image of the image pair based on an intensity gain at the pixel location between the first image and the second image;

determine a weight associated with the pixel location of the first image and a weight associated with the pixel location of the second image based at least on the intensity gain at the pixel location between the first image and the second image, the minimum gain threshold and the maximum gain threshold associated with the first image and the second image; and blend the pixel associated with the pixel location of the first image and the pixel associated with the pixel location of the second image based at least on the intensity scaling factor and the weight.

\* \* \* \* \*